US008880939B2

(12) United States Patent
Hiramatsu et al.

(10) Patent No.: US 8,880,939 B2
(45) Date of Patent: Nov. 4, 2014

(54) STORAGE SUBSYSTEM AND METHOD FOR RECOVERING DATA IN STORAGE SUBSYSTEM

(75) Inventors: Shinichi Hiramatsu, Odawara (JP); Kazue Jindo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 321 days.

(21) Appl. No.: 13/380,221

(22) PCT Filed: Dec. 14, 2011

(86) PCT No.: PCT/JP2011/006993

§ 371 (c)(1), (2), (4) Date: Dec. 22, 2011

(87) PCT Pub. No.: WO2013/088474

PCT Pub. Date: Jun. 20, 2013

(65) Prior Publication Data

US 2013/0159765 A1 Jun. 20, 2013

(51) Int. Cl.
*G06F 11/00* (2006.01)

(52) U.S. Cl.
USPC .......... 714/6.1

(58) Field of Classification Search
CPC .......... G06F 11/10; G06F 11/14
USPC .......... 714/6.1
See application file for complete search history.

(56) References Cited

U.S. PATENT DOCUMENTS 5,564,011 A * 10/1996 Yammine et al. .......... 714/15
7,266,719 B1 * 9/2007 LeCrone et al. .......... 714/5.11
7,409,521 B2 * 8/2008 Umeda .......... 711/170
7,529,782 B2 * 5/2009 Prahlad et al. .......... 1/1
7,536,529 B1 * 5/2009 Chatterjee et al. .......... 711/202
7,613,896 B2 11/2009 Yamamoto et al.
7,631,155 B1 * 12/2009 Bono et al. .......... 711/156
7,783,609 B2 * 8/2010 Chauvet et al. .......... 707/674
7,856,022 B1 * 12/2010 Wigmore .......... 370/395.71
7,945,726 B2 * 5/2011 Faibish et al. .......... 711/112
8,108,644 B2 * 1/2012 Innan et al. .......... 711/170
8,127,096 B1 * 2/2012 Chatterjee et al. .......... 711/162
8,145,942 B2 * 3/2012 Nguyen .......... 714/6.31
8,161,253 B2 * 4/2012 Suarez .......... 711/162
8,402,209 B1 * 3/2013 Chatterjee et al. .......... 711/111
8,438,355 B2 * 5/2013 Lehr et al. .......... 711/165
8,458,421 B2 * 6/2013 Eguchi et al. .......... 711/162
2009/0125694 A1 * 5/2009 Innan et al. .......... 711/170
2009/0210617 A1 * 8/2009 Lehr et al. .......... 711/112
2010/0185589 A1 * 7/2010 Clarke et al. .......... 707/674
2011/0153967 A1 6/2011 Yamamoto et al.
2011/0225379 A1 * 9/2011 Eguchi et al. .......... 711/162
2011/0307659 A1 * 12/2011 Hans et al. .......... 711/114

FOREIGN PATENT DOCUMENTS

JP 2007-280319 A 12/2011

* cited by examiner

*Primary Examiner* — Amine Riad
(74) *Attorney, Agent, or Firm* — Volpe and Koenig, P.C.

(57) ABSTRACT

When a double failure occurs in a storage device storing a mutual conversion table such as a track management information table in thin provisioning, the storage address of the track within the storage subsystem cannot be specified and user data is lost. In order to solve the problem, the present invention provides a storage subsystem capable of recovering data by referring to a track address stored in an accessible track management information table or a user data section, renewing the damaged track management information table to restore the corresponding relationship between track management information tables, and enabling the user data to be accessed again.

11 Claims, 14 Drawing Sheets

HA (Home Address Section) : Storing track address within LDEV (host VOL)

C (Count Section) : Storing track address of LDEV, record #, key length and data length K (Key Section) : User data D (Data Section) : User data

STORAGE SUBSYSTEM AND METHOD FOR RECOVERING DATA IN STORAGE SUBSYSTEM

TECHNICAL FIELD

The present invention relates to a storage subsystem used in a computer system. Further, the present invention relates to a method for recovering data and realizing high data soundness in the allocation of storage areas for writing data to the storage subsystem from a host computer.

BACKGROUND ART

One example of a prior art technique for enabling efficient use of disk space in a storage subsystem is the art of thin provisioning. According to thin provisioning, triggered by the generation of a write I/O (Input/Output) access to the virtual volume, a real volume space (space within a physical media) is dynamically allocated. Usually, the space of the volume to be allocated is divided into units of pages (each of which corresponds to a few hundred tracks), and the management information thereof is stored in a shared memory of the storage subsystem. Patent literature 1 discloses an art related to thin provisioning.

According to U.S. Pat. No. 7,613,896 (Yamamoto et al.), real storage areas to virtual storage areas, the allocation of real storage areas to virtual storage areas and the address conversion from the virtual storage areas to the real storage areas are performed, triggered by a host write access to the virtual storage area. The amount of management information related to address conversion required for input and output of data to or from the virtual storage area is increased in proportion to the number of virtual volumes or the capacity thereof, but this problem is solved by storing the management information in storage devices such as HDDs (Hard Disk Drives) which have low access performance compared to shared memories but are inexpensive.

Further, if the unit of volume space to be allocated is managed in page units (approximately a few hundred tracks) and in track units, the allocation of volume space in track units requires management information in track units to be stored in addition to the management information in page units. The management information in track units is also stored in the storage devices. The management information in track units is stored in a TSE (Track Space Efficient) volume which is a volume accessible via cashing control among a cache memory and storage devices. The TSE volume is divided into a TSE DMT (Dynamic Mapping Table) section storing the management information table in track units and a user data section storing the actual user data, which are composed of separate pages. It is indispensable to refer to the TSE DMT when accessing the TSE volume.

CITATION LIST

Patent Literature

PTL 1: Japanese Patent Application Laid-Open Publication No. 2007-280319 (U.S. Pat. No. 7,613,896)

SUMMARY OF INVENTION

Technical Problem

As described earlier, thin provisioning requires a mutual conversion table of the address of virtual volume and the address of real volume. When failure occurs to the mutual conversion table as management information, stored data cannot be accessed correctly even if there is no failure in the data stored in the storage devices.

In a storage subsystem having redundant storage devices adopting a RAID (Redundant Array of Independent (Inexpensive) Disks) configuration, if double failure occurs to an area of the storage device or the drive itself storing the mutual conversion table (TSE DMT), the mutual conversion table cannot be read. Since the mutual conversion table cannot be read, the location of the user data to be accessed stored in the storage device cannot be determined, and thus, the data will be in a lost state.

Generally in storage subsystems, if the storage devices adopt HDDs, for example, data will not be lost in the RAID configuration unless failure occurs simultaneously to two or more HDDs constituting the RAID group. The aforementioned the mutual conversion table can still be referred to as long as the failure is within a range recoverable via the RAID configuration. However, if a double or more failure occurs to the HDDs constituting the RAID group including the page of the mutual conversion table, the mutual conversion table and other management information will be lost even if the user data section is still accessible. As a result, the address of real volume within the storage subsystem cannot be specified and user data will be lost.

Therefore, the object of the present invention is to provide a storage subsystem capable of referring to the management information stored in the tracks directly when double failure occurs in the storage devices, so as to recover the damaged mutual conversion table and to enable the user data to be accessed again.

Solution to Problem

The present invention solves the above-mentioned problem by providing a means for referring to a track address within an LDEV (track address within a host volume or within a TSE volume) stored in an accessible TSE DMT and renewing the damaged TSE DMT so as to recover data. Further, when it is possible to access the TSE DMT, the present invention enables to refer to the track address within the LDEV (track address within a host volume) stored in an accessible user data section to renew the damaged TSE DMT and restore the corresponding relationship in order to recover data.

More practically, the present invention provides a storage subsystem coupled with a host computer comprising a storage device unit for storing data from the host computer; a control unit for controlling a storage area of the storage device; and a memory unit accessed by the control unit; wherein a logical device in the storage device unit is allocated to a virtual logical device provided to the host computer and a user data from the host computer is stored in the logical device of the storage device unit using a page mapping information stored in the memory unit and a track mapping information stored in the storage device unit; the track mapping information is composed of a first track information including a status information and an address information within the logical device and a second track information including a status information and an address information within the virtual logical device; the first track information and the second track information are associated via the address information; and when the first track information or the second track information is abnormal, recovery is performed using an address information in the other track information which is normal.

Advantageous Effects of Invention

If double failure occurs in the storage devices, the present invention enables to refer to the management information stored in the tracks directly so as to renew the damaged mutual conversion table and to enable user data to be accessed again, so as to improve the soundness of data of the whole storage subsystem.

DESCRIPTION OF EMBODIMENTS

Now, the preferred embodiments of the present invention will be described with reference to the drawings. In the following description, various information are occasionally referred to by the term "table", but the various information can be expressed via data structures other than the table. The term "table" can also be replaced with the term "information" so show that the information does not depend on the data structure.

Sometimes, the processes are described using the term "program" as the subject. The programs are executed via a processor such as a CPU (Central Processing Unit) for performing predetermined processes. A controller can also be used as the subject of the processes, since the processes are performed using arbitrary storage sources (such as memories) and communication interface units (such as communication ports). The controller can include dedicated hardware in addition to the CPU. The computer programs can be installed to the respective computers from a program source. The program source can be provided from a program distribution server or storage media.

The respective elements, such as a PD (Physical Device), a volume or a page can be identified via alphanumeric characters, but other types of identification information such as names can be used as long as they are identifiable information. The identical sections are denoted with the same reference numbers in the present drawings and description, but the present invention is not restricted to the illustrated embodiments, and various modified examples corresponding to the technological idea of the present invention are included in the technical range of the present invention. The number of each component can be one or more than one, unless specified otherwise.

<System Configuration>

Figure 1:
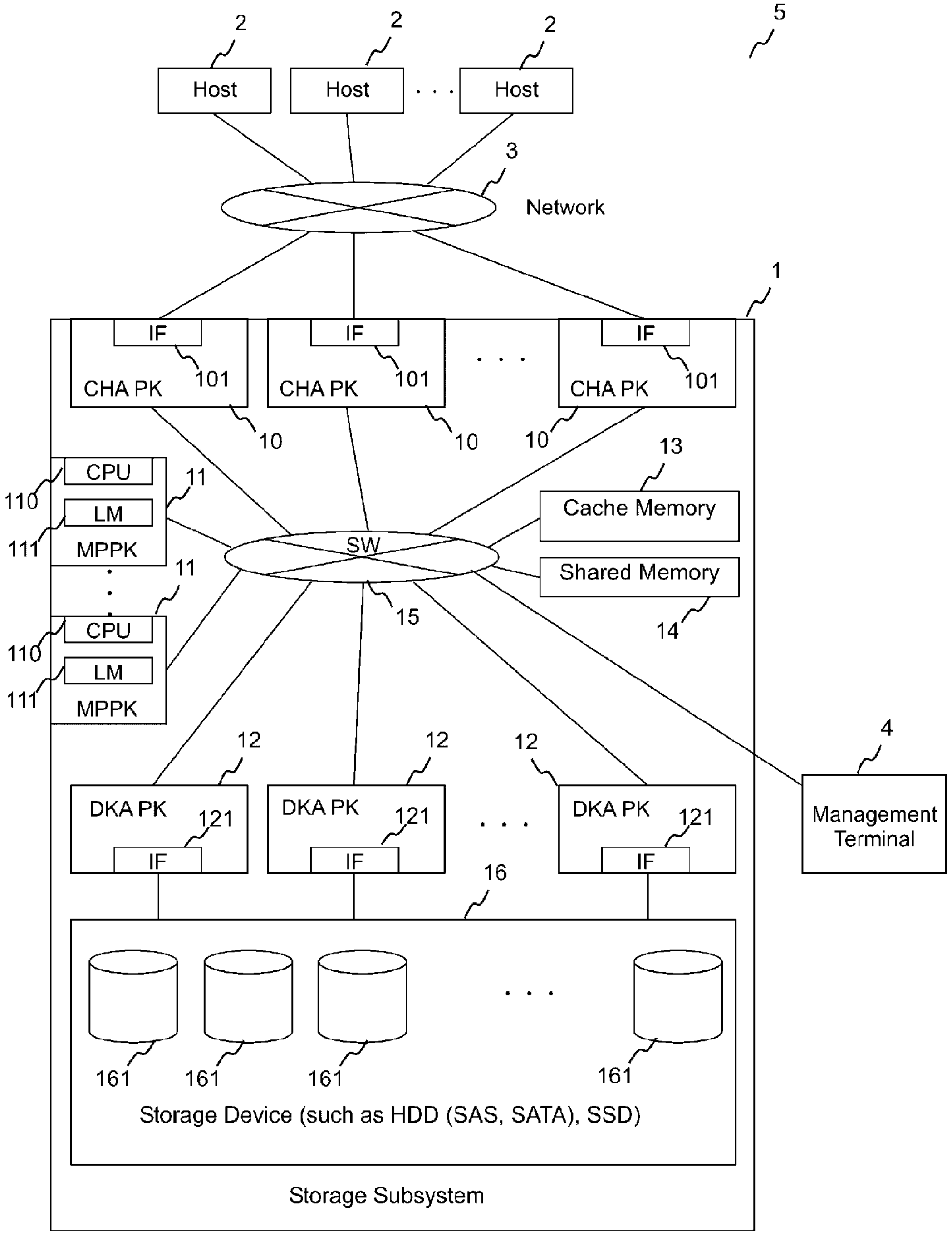
FIG. 1 is a view illustrating an overall configuration example of a storage system including a storage subsystem.

FIG. 1 is a view showing an example of the overall configuration of a storage system including a storage subsystem. The overall configuration of a storage system 5 and an internal configuration of a storage subsystem 1 are illustrated in FIG. 1. The storage system 5 is composed of a storage subsystem 1, a plurality of main frame host computers (hereinafter referred to as hosts) 2 and a management terminal 4.

The storage subsystem 1 and respective hosts 2 are coupled via a network 3. Further, the storage subsystem 1 and the management terminal 4 are coupled via an internal network 15. The above-described network 3 is formed as a wired network using metal cables or optical fiber cables. However, it is possible to couple the respective hosts 2 and the storage subsystem 1 or the storage subsystem 1 and the management terminal 4 via a wireless network. The network 3 can be, for example, a SAN (Storage Area Network) or a LAN (Local Area Network).

<Internal Configuration of Storage Subsystem>

Next, an internal configuration of the storage subsystem 1 will be described. The storage subsystem 1 is composed of one or more CHAPKs (CHannel Adapter PacKages) 10 being coupled to the hosts 2 via the network 3, one or more MPPKs (Micro Processor PacKages) 11, one or more DKAPKs (DisK Adapter PacKages) 12 coupled to a storage unit 16, a cache memory (hereinafter referred to as CM) 13, and a shared memory (hereinafter referred to as SM) 14, wherein the respective components are respectively coupled via an internal network 15.

Each CHAPK 10 includes a CHAIF (CHannel Adapter InterFace) 101, and the CHAIF 101 couples the CHAPK 10 to the network 3. Further, each DKAPK 12 includes a DKAIF (DisK Adapter InterFace) 121, and the DKAIF 121 couples the CHAPK 10 to the storage unit 16. The storage unit 16 is composed of a plurality of storage devices 161, and the storage devices 161 include, for example, a SAS (Serial Attached SCSI) type HDD, SATA (Serial AT Attachment) type HDD, or a SSD (Solid State Drive) composed of a flash memory which is a nonvolatile semiconductor memory. One or more RAID groups can be composed of a plurality of storage devices 161. The MPPK 11 is composed of a plurality of CPUs (Central Processing Units) 110 and local memories (hereinafter referred to as LM) 111 for enabling the CPU 110 to access control information, management information and data at high speed. It is also possible to compose the controller to include the CHAPK 10, the MPPK 11, the DKAPK 12, the cache memory 13 and so on, and to allow the controller to control each main memory device.

<Basic Operation of IO Access>

Next, the basic operation of IO access to the storage subsystem 1 will be described. Upon receiving a write command from one of the hosts 2 via the CHAPK 10, the MPPK 11 of the storage subsystem 1 stores the write data received from the host 2 to the CM 13. The MPPK 11 sends the write data stored in the CM 13 via the DKAPK 12 to the storage unit 16, where the data is written in the storage device 161. The MPPK 11 notifies completion of the write command processing to the host 2 either when the write data (user data) is stored in the CM 13 or when the data is written into the storage device 161.

Upon receiving a read command from one of the hosts 2, the MPPK 11 checks whether the data designated via the parameter of the read command (read target data) is stored in the CM 13 or not. If the read target data is stored in the CM 13, the MPPK 11 reads the read target data from the CM 13 and sends the read target data via the CHAPK 121 to the host 2.

On the other hand, if the read target data is not stored in the CM 13, the MPPK 11 reads the read target data from the storage unit 16 via the DKAPK 12, and stores the acquired read target data in the CM 13. Thereafter, the MPPK 11 sends the read target data stored in the CM 13 to the host 2 via the CHAPK 10.

<Thin Provisioning>

Figure 2:
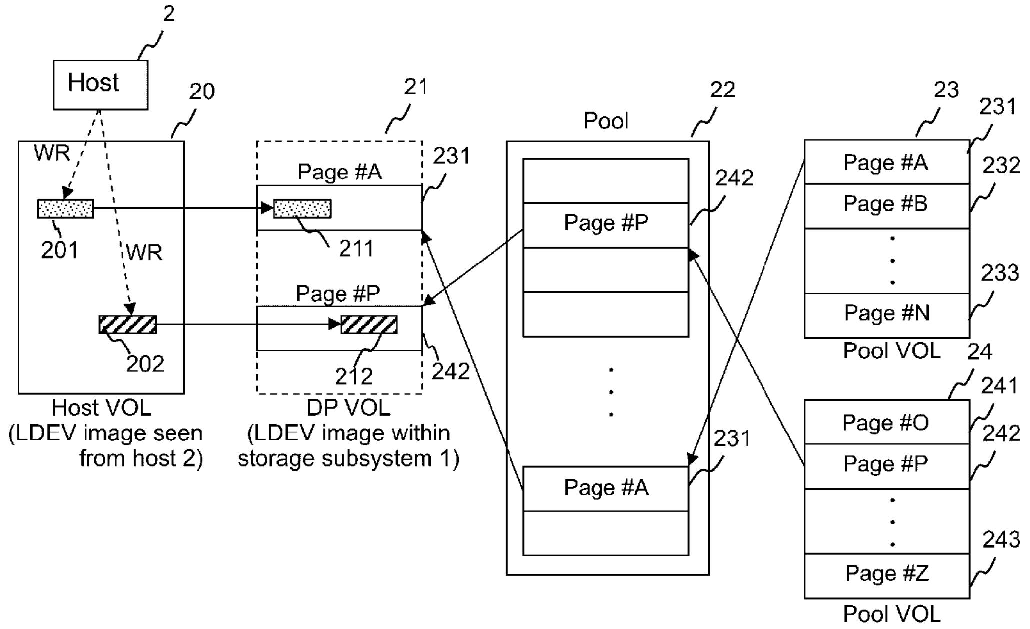
FIG. 2 is a conceptual diagram illustrating the concept of thin provisioning.
Figure 3:
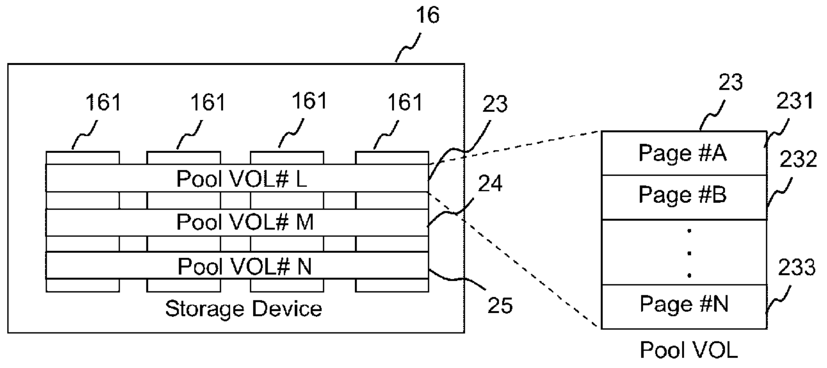
FIG. 3 is a configuration example of a pool volume of a page having a real address in a storage device.

FIG. 2 is a conceptual diagram of the art of thin provisioning, and FIG. 3 is a configuration example of a pool volume of a page having a real address within the storage device. The concept of thin provisioning will be described with reference to FIGS. 2 and 3. Thin provisioning is an art related to the storage subsystem 1 virtually emulating a device (LDEV (Logical Device) observed from the host 2) such as a host volume (hereinafter referred to as host VOL) 20 with respect to the host 2, and providing a virtual volume having a capacity greater than the actual storage area capacity. The host 2 performs the above-described data access by designating an LDEV number and an address within the LDEV of the host VOL 20.

According to thin provisioning, real storage areas of the storage devices 161 of the storage unit 16 of the storage subsystem 1 are not allocated to the host VOL 20 when the host VOL 20 is created. The dynamic allocation of a real storage area in the storage device 161 to a track being the target of the write IO access request is triggered by a write IO access request received from the host 2 to the storage subsystem 1, according to which the storage subsystem 1 enhances the efficiency of the real storage capacity. Such LDEVs are called DP (Dynamic Provisioning) volumes (hereinafter referred to as DP VOL) 21.

Next, we will describe the configuration and operation of the DP VOL 21. The unit of areas allocated to the DP VOL 21 is called a page, and unallocated pages are managed by a group having accumulated unallocated pages called a pool 22. As shown in FIG. 3, the pages are defined within the LDEV called a pool volume (hereinafter referred to as pool VOL) defined in the storage devices 161. For example, pool VOL number "L" (pool VOL #L) 23 is composed of a plurality of storage devices 161, in which a plurality of pages (from page number "A" (page #A) 231 to page number "N" (page #N) 233) exist.

In the actual operation for allocating real storage areas, a write IO access request is sent from the host 2 to a virtual area 201 of the host VOL 20. The MPPK 11 having received the write IO access request determines whether or not a real storage area is allocated to the virtual area 201, and if not, the MPPK 11 searches an unused page in the pool VOLs 23 and 24 of the pool 22. The searched unused page number "A" 231 is assigned to an unused page number "A" of DP VOL 21 and writing of data 211 is performed. In the case of writing data to the virtual area 202, similar to the case of the virtual area 201, the MPPK 11 allocates a page number "P" 242 to the virtual area 202 and writing of data 212 is performed. The actual operation of the process will be described with reference to FIG. 5.

<Page DMT Management>

Figure 4:
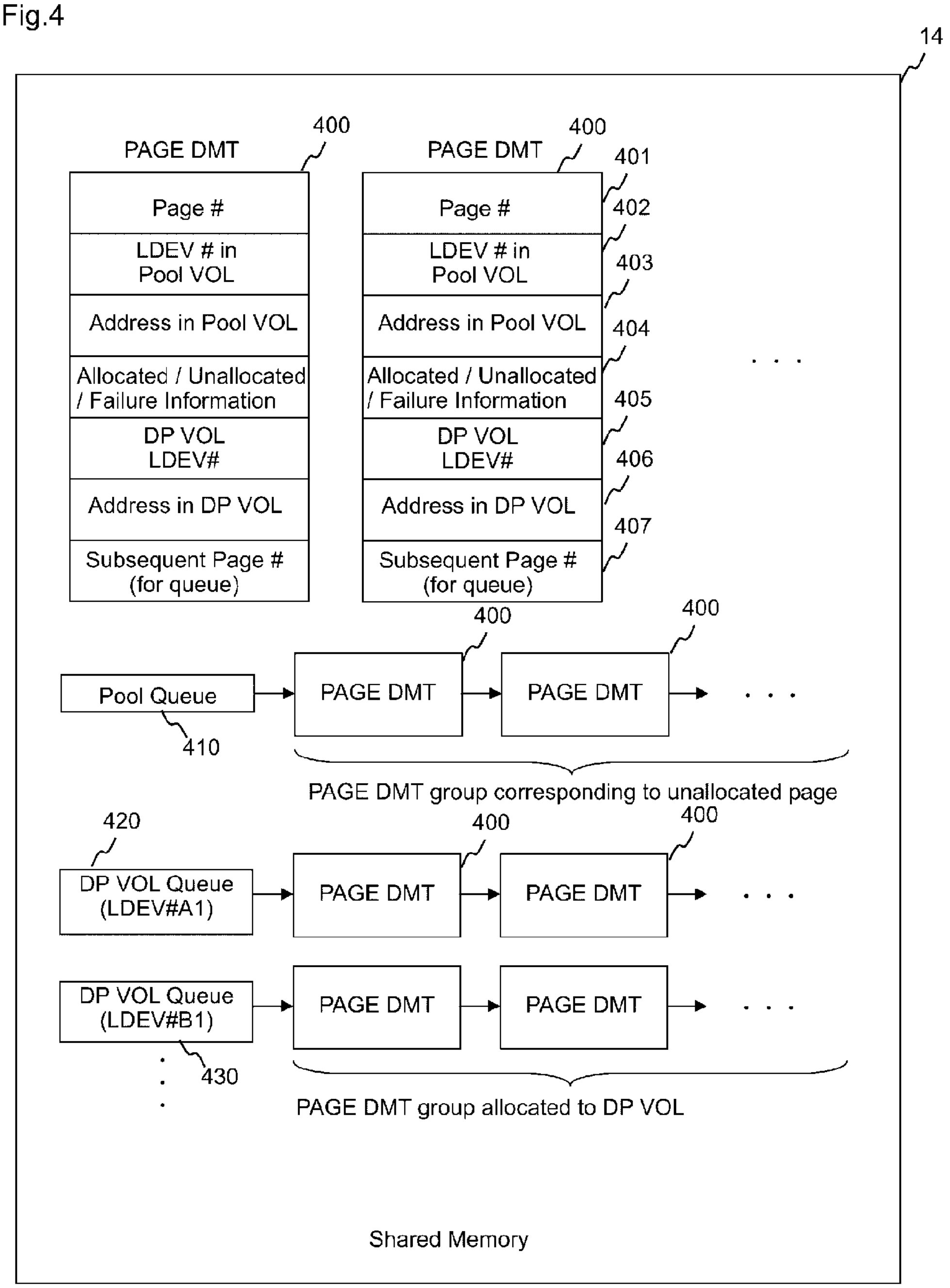
FIG. 4 is a view illustrating a configuration example of a page DMT (Dynamic Mapping Table) for managing the page allocation status.

FIG. 4 is a view showing a configuration example of a page DMT (Dynamic Mapping Table) managing a page allocation status. The page DMT 400 is composed of a page number 401, an LDEV number 402 within the pool VOL, an address 403 within the pool VOL, an allocated/unallocated/failure information 404, a DP volume LDEV number 405, an address 406 within the DP VOL, and a subsequent page number (for queue) 407, which is stored in the SM 14.

A page DMT group corresponding to an unallocated page is coupled to a pool queue 410. Further, allocated page DMT groups already allocated to the DP VOL 21 are coupled respectively to DP VOL queue (LDEV number "A1") 420 and DP VOL queue (LDEV number "B1") 430. When a relevant page is allocated to a virtual area, the coupling of the page DMT corresponding to an unallocated page is changed to the corresponding DP VOL queue. On the other hand, when a page is released via deleting of data or the like, the coupling of the page DMT corresponding to the relevant page is changed to the pool queue 410. As described, the page DMT is defined for each page to store the status of allocation, the address within the DP VOL and so on.

<IO Access Request Processing>

Figure 5:
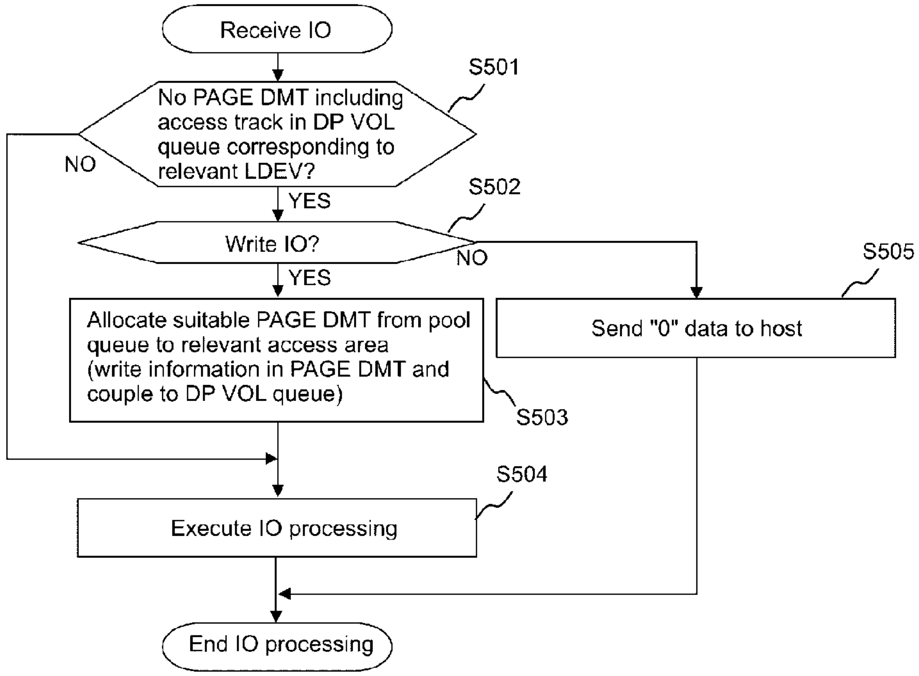
FIG. 5 is a flowchart illustrating an IO access processing via thin provisioning in the storage subsystem.

FIG. 5 shows a flowchart describing an IO access processing via thin provisioning in the storage subsystem 1. First, an IO access request is issued from the host 2 to the storage subsystem 1. When the storage subsystem 1 receives the issued IO access request, the MPPK 11 searches the DP VOL queues (LDEV #A1) 420, (LDEV #B1) 430 and so on corresponding to the LDEV via the access information (LDEV number and address within host VOL 20) of the IO access request. Then, the MPPK 11 determines whether or not a page DMT including a track that corresponds to the IO access request from the host 2 exists or not in the DP VOL queue 420 or the like (step S501). In other words, it is determined whether the virtual area of the IO access request is allocated to a real storage area or not.

If a page DMT exists (step S501: NO), an IO processing (such as a write request or a read request) is executed. If the page DMT does not exist (step S501: YES), it is determined whether the type of the IO access request is a write request or not (such as a read request or a delete request) (step S502). If the IO access request is not a write request (step S502: NO), the MPPK 11 sends data "0" to the host 2 (step S505) and ends the IO access request processing. The storage devices can be used efficiently since during processing of a read request, data "0" is simply sent to the host and no unnecessary page is allocated.

If the IO access request is a write request (step S502: YES), the MPPK 11 selects an appropriate page DMT from a group of page DMTs 400 corresponding to an unallocated page coupled to the pool queue 410, and assigns the same to a virtual area of the IO access request (step S503). At this time, the allocated/unallocated/failure information 404 other than the information already stored in the allocated page DMT (such as the page number 401, the LDEV number 402 within the pool VOL, or the address 403 within the pool VOL) is set to "allocated", corresponding information is written into the LDEV number 405 of the DP VOL and the address within the DP VOL, and coupling is changed from the pool queue to the DP VOL queue. For executing the actual IO access processing, the MPPK 11 writes the write data into the user data area (step S504). After writing in the write data, the MPPK 11 ends the sequence of the IO access request processing.

<TSE Volume>

Figure 6:
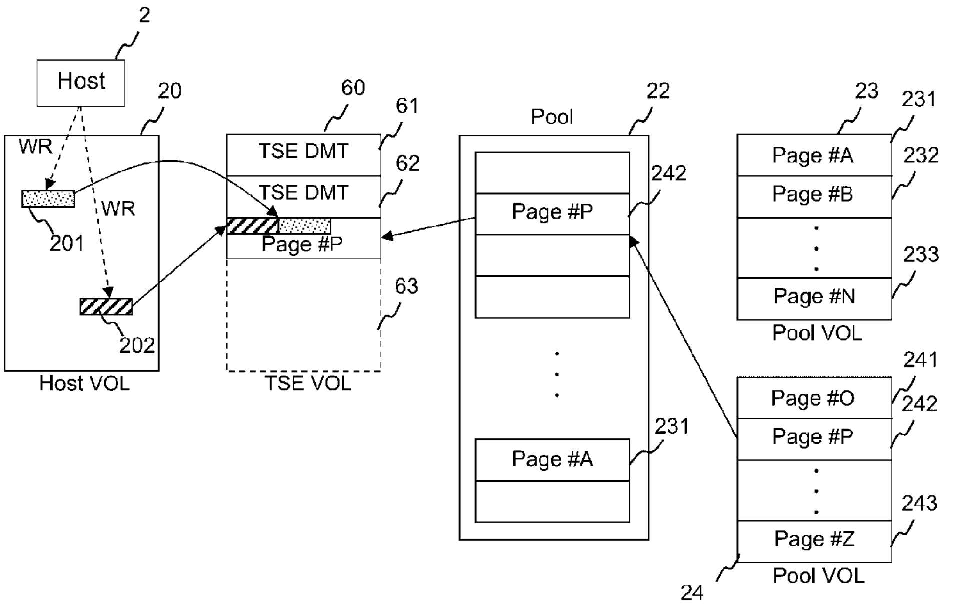
FIG. 6 is a view illustrating a corresponding relationship among a host volume, a TSE volume and a pool.
Figure 7:
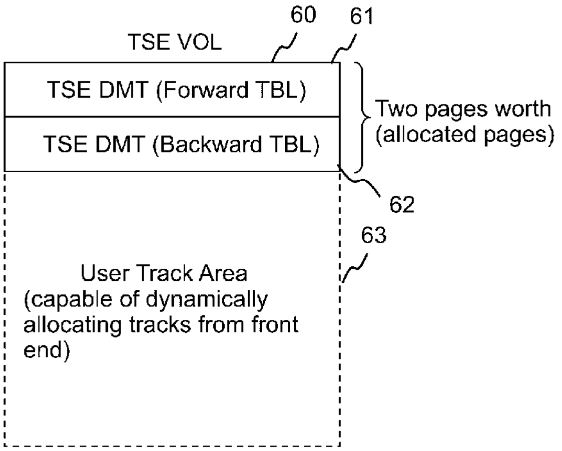
FIG. 7 is a view illustrating a configuration example of a TSE volume.

FIG. 6 is a view showing the correspondence of the host 20, a TSE (Track Space Efficient) volume (hereinafter referred to as TSE VOL) 60 and a pool 22. As shown in FIG. 6, the TSE VOL 60 stores in the first two pages of the volume a TSE DMT (Dynamic Mapping Table) for managing the allocation status of the volume in track units. FIG. 7 is a view showing a configuration example of a TSE volume. As shown in FIG. 7, a forward table (hereinafter referred to as forward TBL) TSE DMT 61 is placed in the first single-page area of the TSE VOL 60, and a backward table (hereinafter referred to as backward TBL) TSE DMT 62 is placed in the next single-page area thereof. The area for arranging the TSE DMT is set to two pages for convenience and easier description, but it can be arranged in more than two pages according to the total capacity of the TSE DMT.

Further, similar to the DP VOL 21, the TSE VOL 60 also allocates real storage areas in the storage devices 161 of the storage unit 16 in page units. Further, as shown in FIG. 7, the track in which data is stored in response to a write request is allocated to a user track area 63 in the volume in order from the front end. At this time, the forward TBL 601 and the backward TBL 602 shown in FIG. 8 are allocated to each user data.

According to such storage of data in which data is stored from the front end, the tracks having distant addresses in the host VOL 20 can still be stored within the same page in the TSE VOL 60. In other words, in FIG. 6, the virtual area 201 and the virtual area 202 have distant addresses within the host VOL 20 but the real data is stored adjacent one another in page number "P" 242 allocated to the user track area 63 in the TSE VOL 60. Therefore, by using the TSE VOL 60, it becomes possible to use the storage capacity of the storage devices more efficiently compared to the case where only the prior art DP VOL 21 is used.

Figure 8:
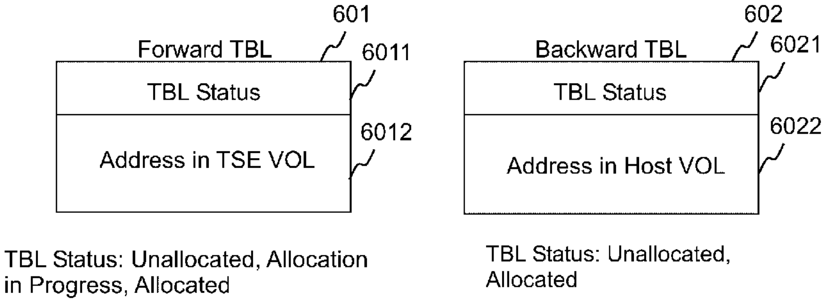
FIG. 8 is a view illustrating a configuration example of a TSE DMT.
Figure 9:
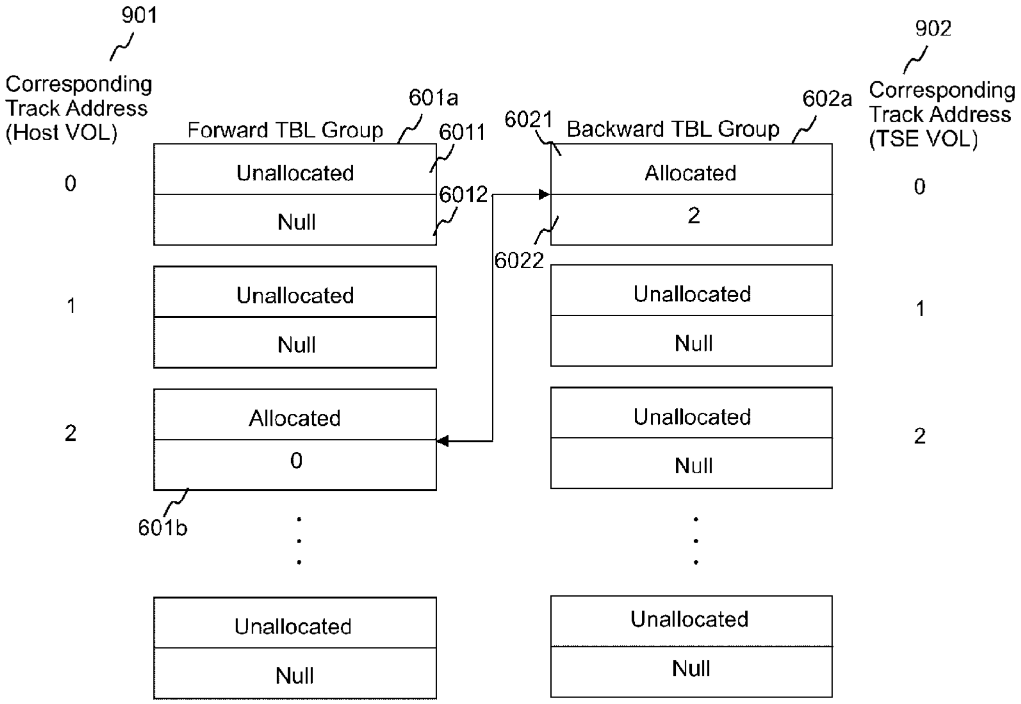
FIG. 9 is an explanatory view showing a track allocation status to the forward table and the backward table.

FIG. 8 is a view showing a configuration example of the TSE DMT. FIG. 9 is a view describing the state of allocation of tracks to the forward TBL and the backward TBL. Next, the configuration and operation of the TSE DMT for controlling the allocation in track units will be described with reference to FIG. 7 through 9.

First, upon creating the TSE VOL 60 of FIG. 7 in the storage subsystem 1, the MPPK 11 extracts two suitable pages from the pool 22 and allocates pages extracted from the front end of the TSE VOL 60. The third and subsequent pages are used as areas for allocating user tracks. As shown in FIGS. 7 and 8, the TSE DMT 61 and 62 are composed of two types of data for the forward TBL 601 corresponding to tracks within the host VOL 20 and for the backward TBL 602 corresponding to tracks within the TSE VOL 60.

The forward TBL 601 of FIG. 8 is composed of a table status area (hereinafter referred to as TBL status area) 6011 and an address area 6012 in the TSE VOL 60. The state information selected from "unallocated", "allocation in progress" or "allocated" is stored in the TBL status area 6011 to identify the allocation status of tracks. Further, the address area 6012 within the TSE VOL 60 in the forward TBL 601 stores a track address 902 within the TSE VOL 60.

On the other hand, the backward TBL 602 is composed of a TBL status area 6021 and an address area 6022 within the host VOL 20. The state information of either "unallocated" or "allocated" is stored in the TBL status area 6021 to identify the allocation status of tracks. Further, the address area within the host VOL 20 of the backward TBL 602 stores a track address 901 within the host VOL 20.

Even further, if a track is allocated to the TSE VOL 60, the forward TBL and the backward TBL will designate mutual track addresses. That is, as shown in FIG. 9, in the forward TBL 601*b* in which the corresponding track address 901 within the host VOL 20 is "2", the TBL status area 6011 is set to "allocated" to indicate the already allocated status. Further, by storing "0" in the track address area 6012 within the TSE VOL 60, it shows that the corresponding backward TBL 602 is the backward TBL 602*a* where the track address 902 in the TSE VOL 60 is "0".

Similarly, in the backward TBL 602*a*, the TBL status area 6021 is set to "allocated" to indicate the allocated status, and "2" is stored in the track address area 6022 within the host VOL 20 to denote the forward TBL 601*b*. As described, the forward TBL 601*b* and the backward TBL 602*a* mutually denote the corresponding track addresses, which satisfy a one-to-one relationship. A single forward TBL 601 within a forward TBL group is set to correspond to only a single backward TBL 602 within a backward TBL group, and a single forward TBL is not set to correspond to a plurality of backward TBLs or a single backward TBL is not set to correspond to a plurality of forward TBLs. If such state exists, the state is referred to as an invalid status, and such invalid status must be resolved via a recovery processing of the TSE invalid status as described in detail later.

In the forward TBL 601 and the backward TBL 602 in unallocated statuses, "unallocated" is stored in both TBL status areas 6011 and 6021, and the information of track address areas 6012 and 6022 are set to null. Further, the forward TBL 601 and the backward TBL 602 have codes (LRC (Longitudinal Redundancy Check), ECC (Error Correcting Code) or the like) for guaranteeing the information stored within the TBL.

<IO Access Processing of TSE VOL>

Figure 10:
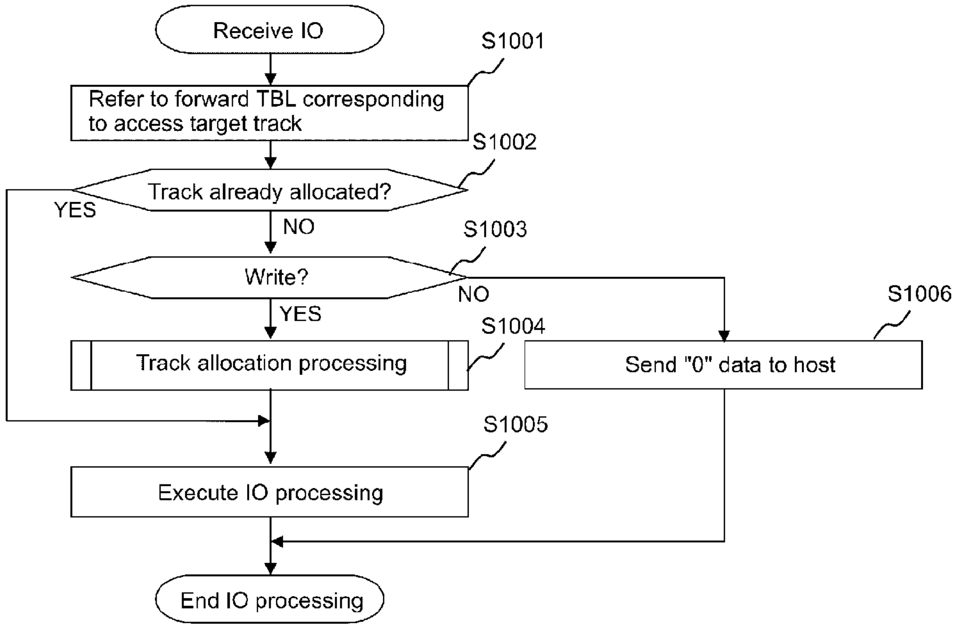
FIG. 10 is a flowchart illustrating an IO processing of the TSE volume.
Figure 11:
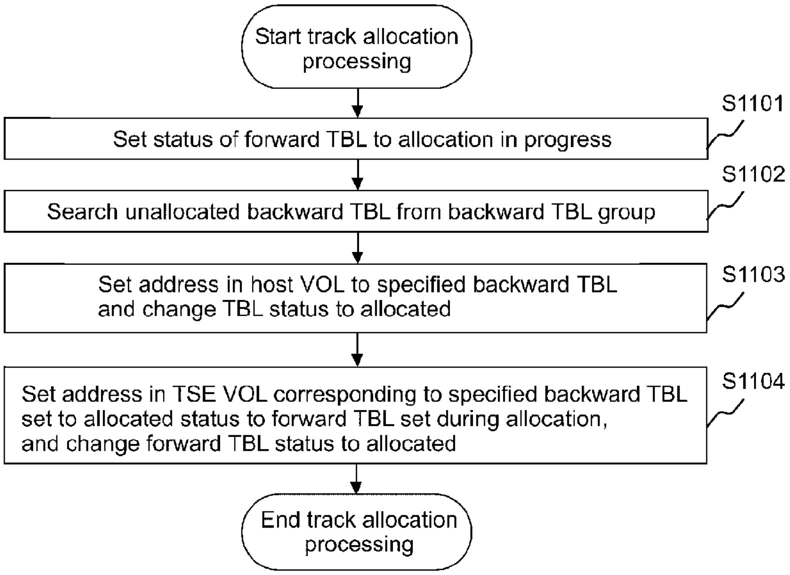
FIG. 11 is a flowchart illustrating a track allocation processing to the TSE volume.

FIG. 10 is a flowchart illustrating the IO processing of the TSE volume. FIG. 11 is a flowchart illustrating a process for allocating tracks to a TSE volume. The processing of the IO access request of the TSE VOL 60 will be described with reference to FIGS. 10 and 11.

When an IO access request is output from the host 2 to the storage subsystem 1, the MPPK 11 refers to the forward TBL 601 corresponding to the track (access target track) in the host VOL 20 based on the address in the IO access request (step S1001). Next, the MPPK 11 determines whether the TBL status area 6011 of the forward TBL 601 being referred to is already allocated or not (step S1002). If the track is allocated (step S1002: Yes), the MPPK 11 executes an IO access request processing (write request or read request) (step S1005).

In other words, the MPPK 11 writes the user data to the relevant track corresponding to the write request from the front end. If the IO access request is a write request in page units, the data in the page must be read temporarily and then the data having matched the read data with the write data will be written, but such operation is not necessary in a write request processing in track units.

If the track is unallocated (step S1002: NO), the MPPK 11 determines whether the IO access request is a write request or not (step S1003). If the IO access request is not a write request (step S1003: NO), the MPPK 11 determines that the request is a read request, so that no tracks are allocated, and "0" data is sent to the host 2. If the IO access request is a write request (step S1003: Yes), the MPPK 11 executes the track allocation processing of FIG. 11 (step S1004). After executing the track allocation processing, the IO access processing via the aforementioned step S1005 will be executed.

Next, the track allocation processing of step S1004 will be described with reference to FIG. 11. First, the MPPK 11 selects one or more appropriate forward TBLs 601 from the forward TBL group 61 in the TSE VOL 60, and changes the TBL status area 6011 of the selected forward TBL 601 from "unallocated" to "allocation in progress" (step S1101). Next, the MPPK 11 specifies a number of "unallocated" backward TBLs 602 corresponding to the number of forward TBLs 601 selected in step S1101 from the backward TBL group 61 (step S1102).

Next, the MPPK 11 stores the track address 901 in the host VOL 20 to the track address area 6022 of the backward TBL 602 being specified, and changes the TBL status area 6021 to "allocated" (step S1103). Next, the MPPK 11 stores the track address 902 in the TSE VOL 60 corresponding to the backward TBL 602 being specified and set to "allocated" in the track address area 6012 of the forward TBL 601 set to "allocation in progress". Lastly, the MPPK 11 changes the TBL status area 6011 of the forward TBL 601 from "allocation in progress" to "allocated" (step S1104) and ends the process.

If a page DMT 400 is not allocated, at first, the page DMT allocation processing of FIG. 5 is executed, and then the above-described track allocation processing is executed. According to the above-described IO access request processing and the track allocation processing corresponding to the request processing, the real storage areas can be allocated in track units triggered by a write IO access even when the real storage area is not allocated to the virtual area.

<Recovery Processing when Failure Occurs in TSE DMT>

<Failure Detection Processing>

In the present embodiment, it is assumed that accessed to a pool VOL 22 including the pages used as TSE DMT 61 and 62 is disabled due to a double failure of the storage device. There are three failure patterns of the TSE DMT 61 and 62 which are (F1) through (F3) listed below. The TSE DMT recovery method according to the three cases are respectively described.

Figure 12:
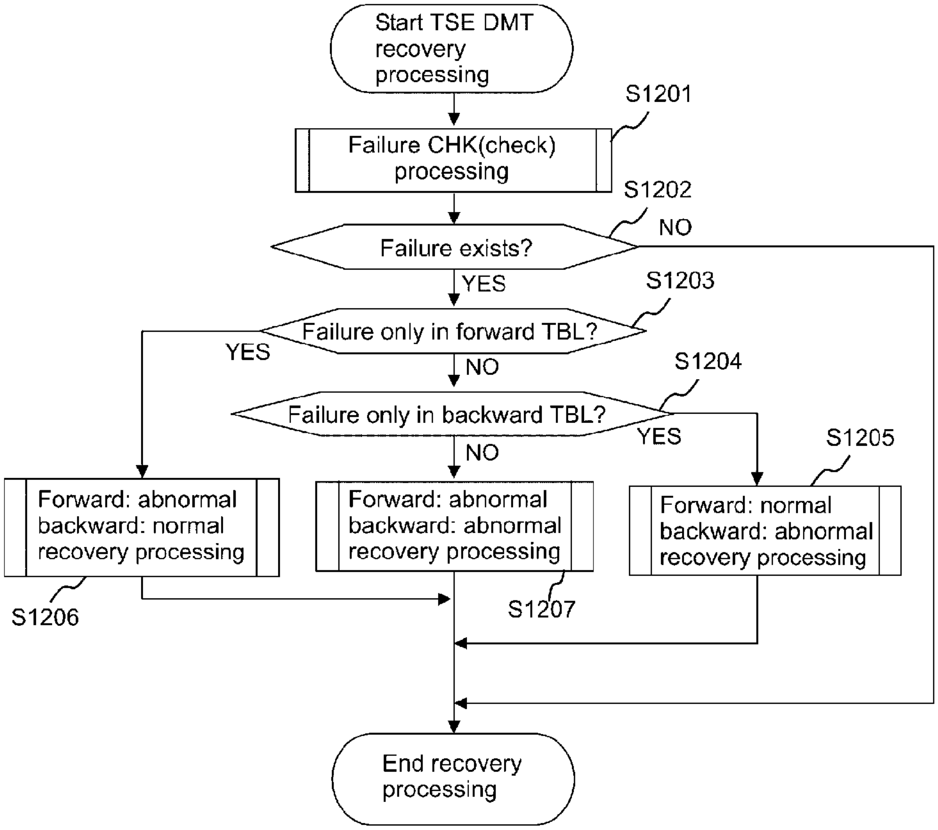
FIG. 12 is a flowchart illustrating a recovery processing of the TSE DMT of the TSE volume.

(F1) Forward TBL 601: normal, backward TBL 602: abnormal (F2) Forward TBL 601: abnormal, backward TBL 602: normal (F3) Forward TBL 601: abnormal, backward TBL 602: abnormal The recovery of the TSE DMT is executed automatically at a timing when the failure status is detected within the storage subsystem 1. It is also possible for the administrator or the user to demand recovery of the TSE DMT directly from the management terminal 4 or the host 2 to the storage subsystem 1. FIG. 12 is a flowchart showing the recovery processing of the TSE DMT in the TSE VOL 60. In any case, the TSE DMT can be recovered by executing the recovery processing of FIG. 12. The flowchart of failure detection and recovery processing of FIG. 12 shows the TSE DMT recovery processing in a single LDEV. In order to perform TSE DMT recovery processing in a plurality of LDEVs, the processing of FIG. 12 should be executed for each LDEV.

Figure 13:
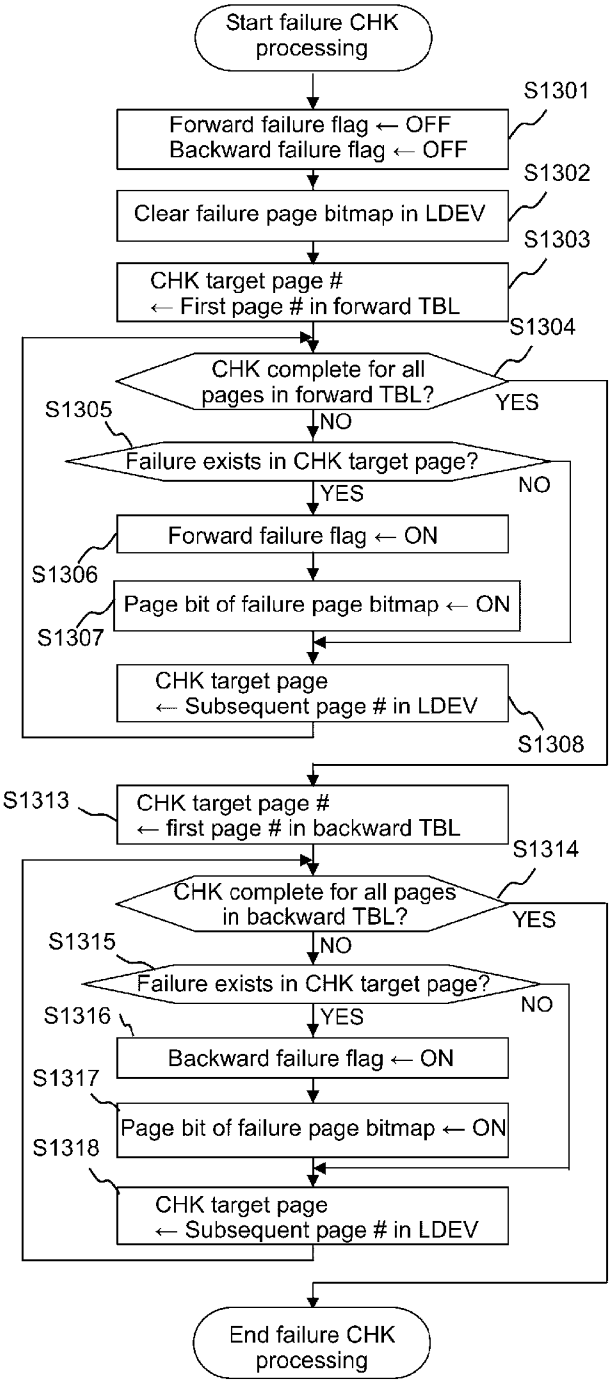
FIG. 13 is a flowchart illustrating a failure check processing for determining whether failure has occurred or not and the type of the failure occurrence table.

At first, the operation of the failure check processing of the TSE DMT and the operation of the recovery processing of the TBL where failure has occurred in the TSE VOL 60 will be described with reference to the flowchart of FIG. 12. First, the MPPK 11 checks whether failure has occurred to the storage device of the pool VOL 22 including the page used as TSE DMT and the type of the TBL in which failure has occurred (forward TBL 601 or backward TBL 602) (step S1201). FIG. 13 is a flowchart showing a failure check processing for determining whether failure has occurred and the type of the TBL in which failure has occurred. The actual operation of the failure check processing (step S1201) will be described with reference to FIG. 13.

First, the MPPK 11 sets the forward failure flag and the backward failure flag to "OFF" (step S1301), clears the contents of the failure page bitmap within the LDEV (step S1302), and stores the first page number within the forward TBL to the check target page number (step S1303). After completing initialization of the failure check flag, the bitmap and the like, the MPPK 11 executes a check on the soundness of the forward TBL 601.

First, the MPPK 11 confirms whether all the pages storing the forward TBL 601 has been checked or not (step S1304). In the present embodiment, a single page stores the forward TBL 601 and a single page stores the backward TBL 602, but in some cases, the capacity for storing all the TBLs may be two pages or more. Thus, the present step confirms whether all the pages storing the forward TBL has been checked or not.

The first single page is checked at first, so the procedure advances to "NO" of step S1304, where the MPPK 11 determines whether the check target page has a failure or not (step S1305). If there is no failure in the check target page (step S1305: NO), the MPPK 11 executes step S1308. The MPPK 11 determines whether failure exists or not by confirming the guarantee codes (LRC and the like) of the storage information within the aforementioned forward TBL 601 and the backward TBL 602. When failure exists in the check target page (step S1305: YES), the MPPK 11 sets the forward failure flag to "ON" (step S1306) and also sets the corresponding page bit of a failure page bitmap to "ON" (step S1307).

Next, the MPPK 11 stores a subsequent page number to the check target page number so as to set the check target page as the subsequent page within the LDEV (step S1308). Then, the MPPK 11 returns the process to step S1304 where it reconfirms whether all pages storing the forward TBL has been checked or not. If all pages are not checked (step S1304: NO), the MPPK 11 executes the process of step S1305 and subsequent steps again, and when all pages have been checked (step S1304: YES), the MPPK 11 executes a soundness check of the page storing the backward TBL 602 of step S1313 and subsequent steps.

Similarly in the process of checking the backward TBL 602, the MPPK 11 stores the check target page number to the first page number in the backward TBL (step S1313). Next, the MPPK 11 confirms whether all the pages storing the backward TBL 602 have been checked or not (step S1314). Since not all the pages are confirmed at first, the procedure advances to "NO" of step S1314, and the MPPK 11 determines whether failure exists in the check target page or not using the guarantee code (such as the LRC) (step S1315). If there is no failure in the check target page (step S1315: NO), the MPPK 11 executes step S1318 and subsequent steps. If failure exists in the check target page (step S1315: YES), the MPPK 11 turns the backward failure flag ON (step S1316) and turns the corresponding page bit of the failure page bitmap ON (step S1317).

Next, the MPPK 11 stores a subsequent page number to the check target page number so as to set the check target page as the subsequent page within the LDEV (step S1318). Then, the MPPK 11 returns the process to step S1314 and confirms whether all the pages storing the backward TBL 602 has been checked or not. If not all pages have been checked (step S1314: NO), the MPPK 11 executes the processes of step S1315 and the subsequent steps again, and when all pages have been checked (step S1314: YES), the MPPK 11 ends the failure check processing and returns the process to the flow of FIG. 12.

According to the above-described process, the MPPK 11 can determine whether failure has occurred or not in the TBL and the type of the page in which failure has occurred (the page storing the forward TBL, the page storing the backward TBL, or the page storing both TBLs).

After completing the failure check processing, the MPPK 11 executes a recovery processing of the TBL of step S1202 and subsequent steps of FIG. 12. First, the MPPK 11 determines whether failure was found in the failure check processing from the failure page bitmap (step S1202). If failure exists, in other words, if even a single page bit of the failure page bitmap is "ON" (step S1202: YES), the MPPK 11 determines the type of the TBL in which failure has occurred via steps S1203 and S1204.

Figure 14:
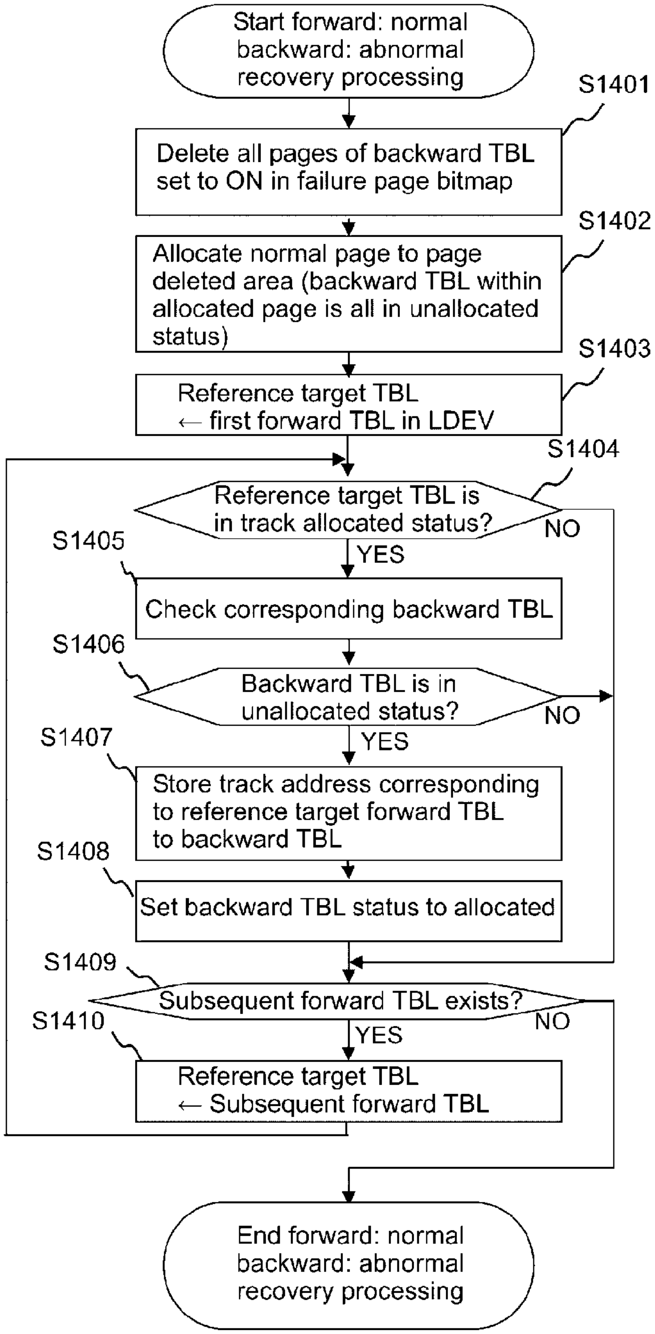
FIG. 14 is a flowchart illustrating a recovery processing of a failure having occurred in the backward table.

If the forward failure flag is "OFF" and the backward failure flag is "ON", the MPPK 11 determines that the failure is in state (F1) (forward TBL 601: normal, backward TBL 602: abnormal), and executes the processing of the TBL recovery processing step S1205 (refer to FIG. 14). FIG. 14 is a flowchart illustrating the recovery processing of the failure that occurred in the backward TBL.

Figure 15:
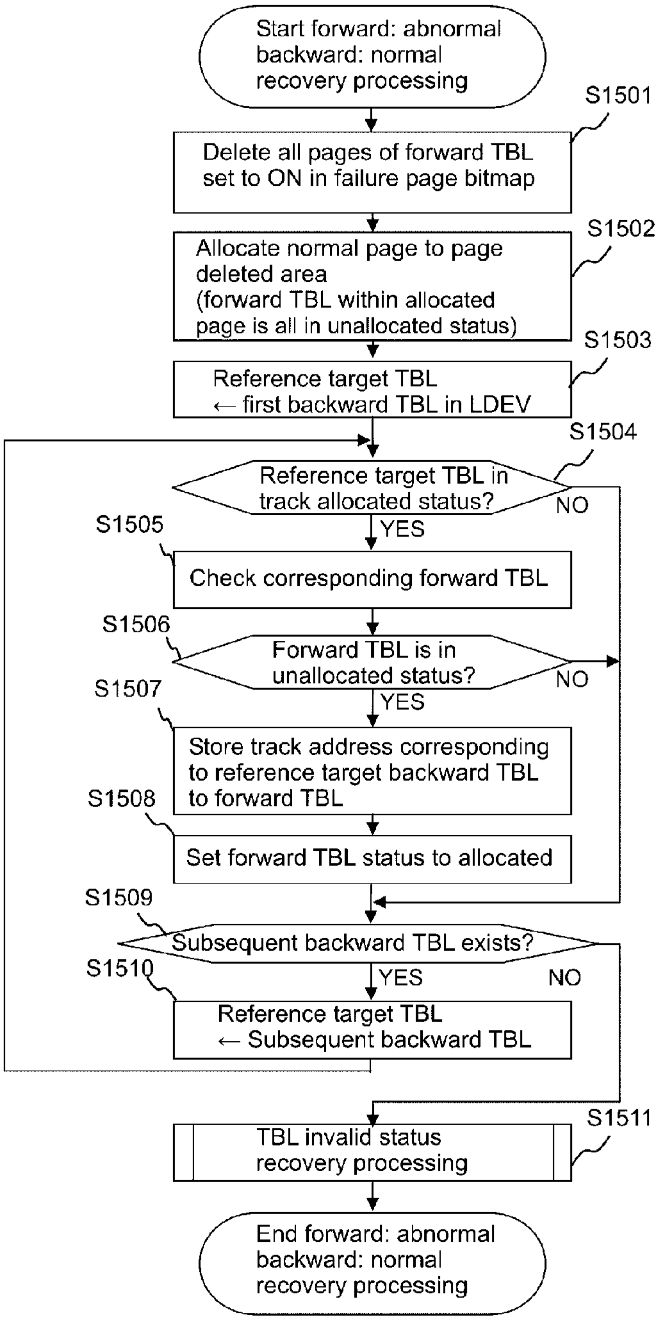
FIG. 15 is a flowchart illustrating a recovery processing of a failure having occurred in the forward table.

If the forward failure flag is "ON" and the backward failure flag is "OFF", the MPPK 11 determines that the failure is in state (F2) (forward TBL 601: abnormal, backward TBL 602: normal), and executes the processing of the TBL recovery processing step S1206 (refer to FIG. 15). FIG. 15 is a flowchart illustrating the recovery processing of the failure that occurred in the forward TBL.

Figure 18:
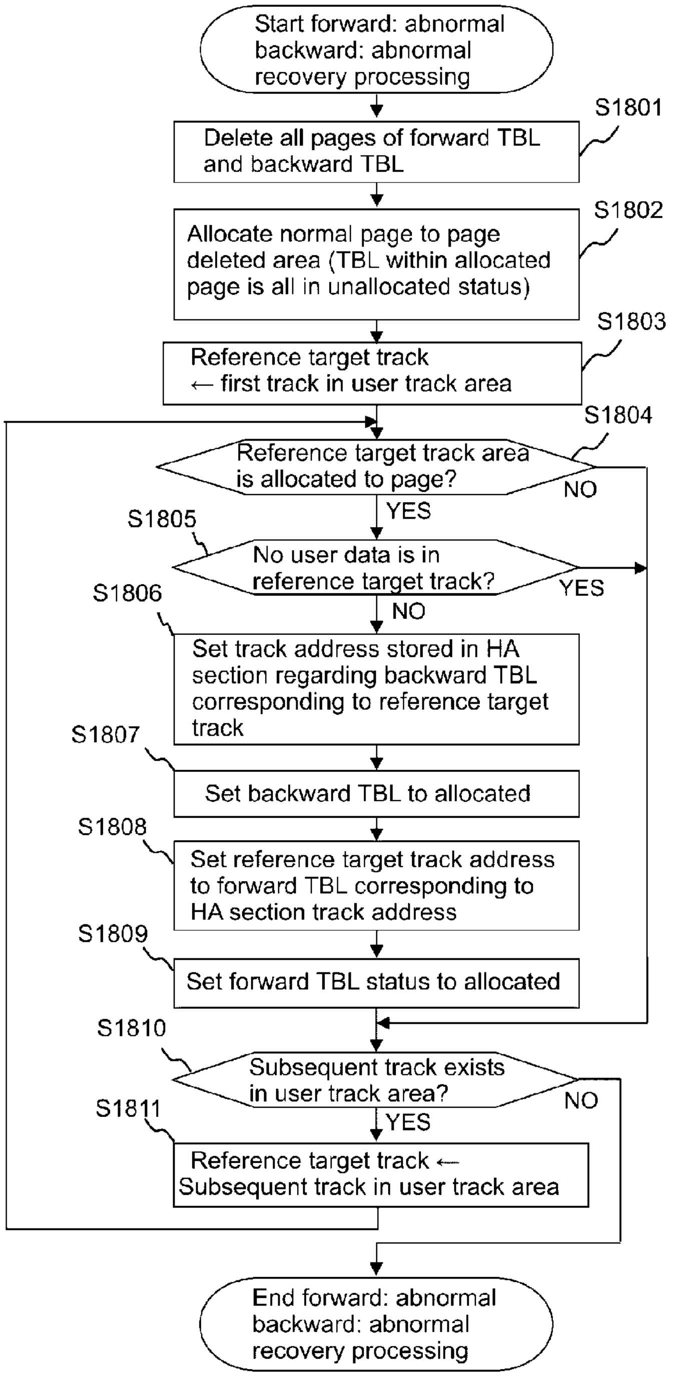
FIG. 18 is a flowchart illustrating a recovery processing when failure has occurred in both the forward table and the backward table.

If both the forward failure flag and the backward failure flag are "ON", the MPPK 11 determines that the failure is in state (F3) (forward TBL 601: abnormal, backward TBL 602: abnormal), and executes the processing of the TBL recover processing step S1207 (refer to FIG. 18). FIG. 18 is a flowchart illustrating the recovery processing of the failure that occurred in both the forward TBL and the backward TBL.

<Recovery Processing when Only Either One of the TBLs is Abnormal>

Now, the recovery processing of the case where only either one of the TBLs, the forward TBL or the backward TBL, is abnormal will be described with reference to FIGS. 14 and 15. FIG. 14 is a flowchart showing the recovery processing when a failure has occurred to only the backward TBL. Further, FIG. 15 is a flowchart of the recovery processing when a failure has occurred to only the forward TBL.

The recovery processing when abnormality has occurred to either one of the TBLs is basically performed by referring to the TBL information of the normal TBL and renewing the TBL where failure has occurred. In the track allocation processing within TSE VOL 60 (refer to FIG. 11), a state occurs in which the TBL status area 6021 of the backward TBL 602 is "allocated" but the TBL status area 6011 of the forward TBL is not "allocated".

Figure 16:
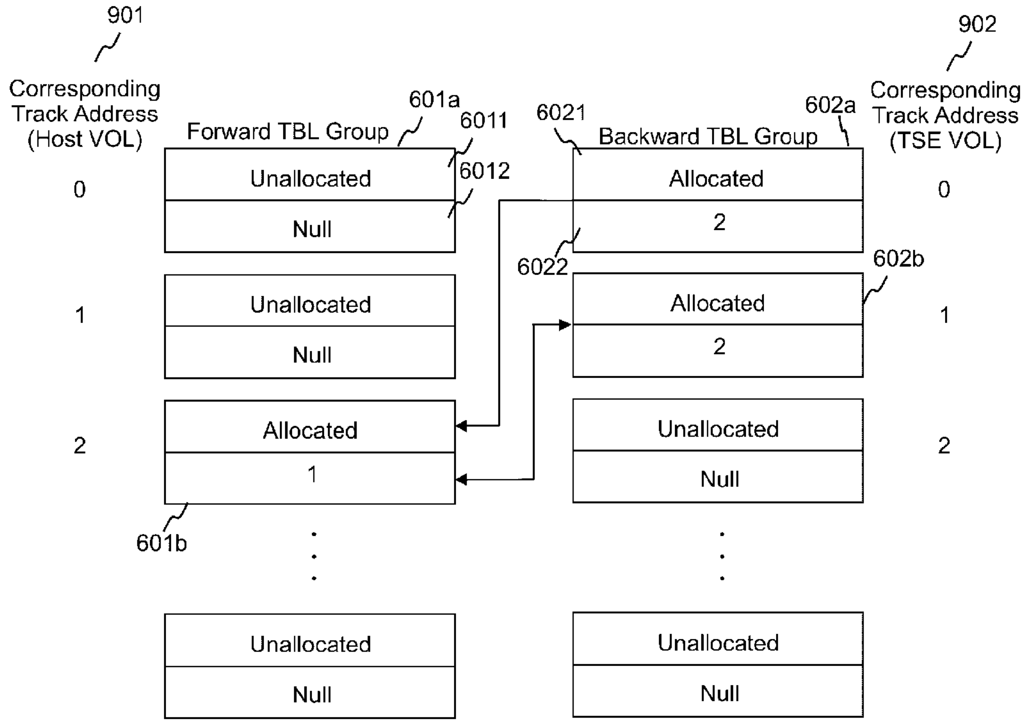
FIG. 16 is a view illustrating an invalid status in the corresponding relationship between the forward table and the backward table.

Such case occurs when a process is temporarily interrupted via a temporal error or the like at a certain timing. Such state is called an invalid status, wherein only the backward TBL 602*a* designates the forward TBL 601*b* (wherein an address is stored only in the track address area 6022 of the backward TBL 602*a* and a value "null" is stored in the track address area 6012 of the forward TBL). In the retry processing after error has been resolved, it is possible that the forward TBL 601*b* is associated with a backward TBL 602*b* which differs from the backward TBL 602*a*, as shown in FIG. 16. Therefore, it is necessary to include a process for resolving the invalid status of correspondence between TBLs in the TSE DMT recovery processing. The TSE DMT recovery processing for resolving the invalid status will be described in detail later.

<TSE DMT Recovery (F1) Forward TBL: Normal, Backward TBL: Abnormal>

First, the recovery processing of the case where abnormality has occurred to only the backward TBL 602 will be described with reference to FIG. 14. First, the MPPK 11 deletes all pages of the backward TBL which is set to "ON" in the failure page bitmap (step S1401). Next, the MPPK 11 assigns to the page delete area a normal page corresponding to a page DMT 400 being coupled to the pool queue 410 and updates the contents of the page DMT 400 (step S1402). At this time, the MPPK 11 turns all the TBL status areas 6021 of the backward TBL 602 within the page having been allocated to "unallocated". Next, the MPPK 11 sets the reference target TBL to the forward TBL 601 at the leading end within the LDEV (step S1403).

Next, the MPPK 11 determines whether the state of the reference target TBL is track allocated or not (step S1404). If the track is not allocated (step S1404: NO), the MPPK 11 determines whether the next forward TBL 601 exists or not (step S1409). If the track is allocated (step S1404: YES), the MPPK 11 specifies the corresponding backward TBL 602 based on the track address (track address within TSE VOL 60) stored in the track address area 6012 of the forward TBL 601, and confirms the TBL status area 6021 of the specified backward TBL 602 (step S1405).

If the TBL status area 6021 of the backward TBL 602 is "unallocated" (step S1406: YES), the MPPK 11 stores in the track address area 6022 of the backward TBL 602 a track address in the host VOL corresponding to the reference target forward TBL 601 (step S1407). Thereafter, the MPPK 11 changes the TBL status area 6021 of the backward TBL 602 from "unallocated" to "allocated" (step S1408). According to the above-described process, it is possible to realize a one-to-one correspondence of a single normal forward TBL 601 and a backward TBL 602 renewed to a normal status.

Next, the MPPK 11 confirms whether other forward TBL 601 to be processed exists or not (step S1409). If there is no forward TBL 601 to be processed (step S1409: NO), the MPPK 11 ends the recovery processing of the backward TBL in abnormal status. If there still exists a forward TBL 601 to be processed (step S1409: YES), the MPPK 11 sets the reference target TBL to the next forward TBL 602 (step S1410) so as to execute the process of step S1404 and subsequent steps again, and repeats the processes until there is no more forward TBL 601 to be processed. Thereafter, the recovery processing of the backward TBL in abnormal status is ended.

As described, it is possible to recover the backward TBL 602 in abnormal status using the track address of the forward TBL 601 in normal status during the recovery processing of FIG. 14. By storing the pool VOL 22 including pages used as TSE DMT 61 and 62 in an SSD or an SAS HDD that can be accessed at high speed, it becomes possible to reduce the recovery time. Further, it is possible to allocate a page of the SSD enabling high speed access when allocating a new page in step S1401 to thereby complete the TBL recovery at high speed, and after completing TBL recovery, the allocation of the relevant page can be changed to an SAS HDD page or an SATA HDD page having greater capacity.

<TSE DMT recovery (F2) Forward TBL: Abnormal, Backward TBL: Normal>

Next, an opposite case of FIG. 14 in which only the forward TBL 601 is abnormal will be described with reference to FIG. 15. The two differences between the recovery processing of FIG. 14 and the recovery processing of FIG. 15 is that in the latter case the recovery target is the forward TBL and that a recovery processing of the TBL invalid status is required. Therefore, the processes from steps S1501 to S1510 are the same if the forward TBL is rephrased to backward TBL and the backward TBL is rephrased to forward TBL. In other words, the present processing uses the track address in the host VOL stored in the address area of a normal backward TBL so as to specify the associated forward TBL.

Figure 20:
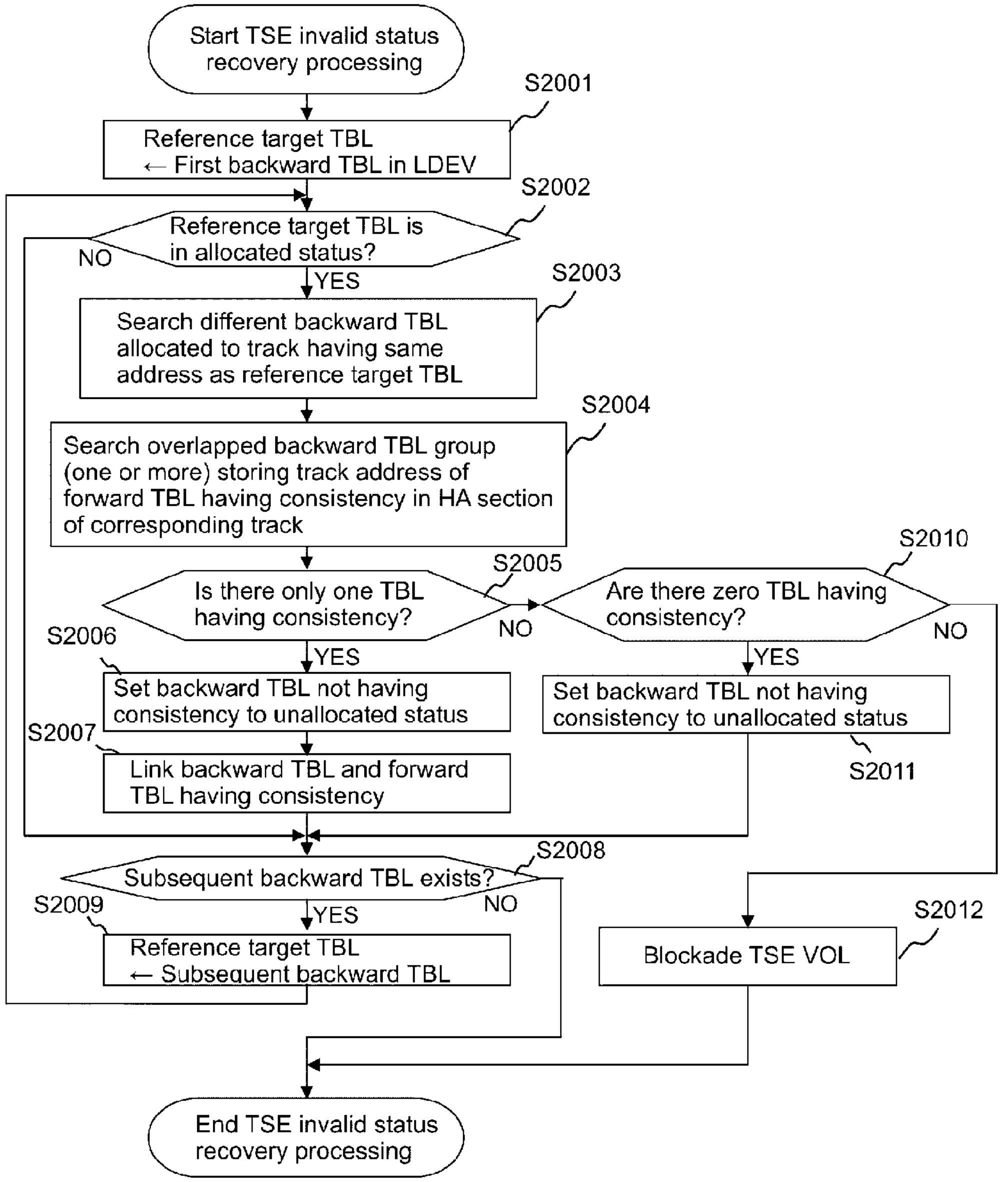
FIG. 20 is a flowchart illustrating a process for recovering an invalid status of the corresponding relationship between tables.

FIG. 16 is a view illustrating the invalid status between the corresponding relationships of the forward TBLs and the backward TBLs. FIG. 20 is a flowchart illustrating the process for recovering the invalid status of correspondence between TBLs. The second difference mentioned earlier, that is, the recovery processing of the TBL invalid status, will be described with reference to FIGS. 16 and 20. At first, the invalid status of correspondence between TBLs will be described in detail with reference to FIG. 16. In the track allocation processing of TSE VOL 60 (refer to FIG. 11), a state occurs in which the TBL status area 6021 of the backward TBL 602 is "allocated" but the TBL status area 6011 of the forward TBL 601 is not "allocated".

In other words, as shown in FIG. 16, the track address area of the forward TBL 601*b* is set to "1" (track address in TSE VOL 60) to denote the backward TBL 602*b*, and the track address area of the backward TBL 602*b* is set to "2" (track address in host VOL 20) to denote the forward TBL 601*b*, by which the TBLs are mutually associated. However, only the backward TBL 602*a* has the corresponding track address area set to "2" to be associated with the forward TBL 601*b*. Therefore, in order to resolve such invalid status, the TBL invalid status recovery processing of FIG. 20 is executed.

<Data Format of Main Frame Track>

Figure 17:
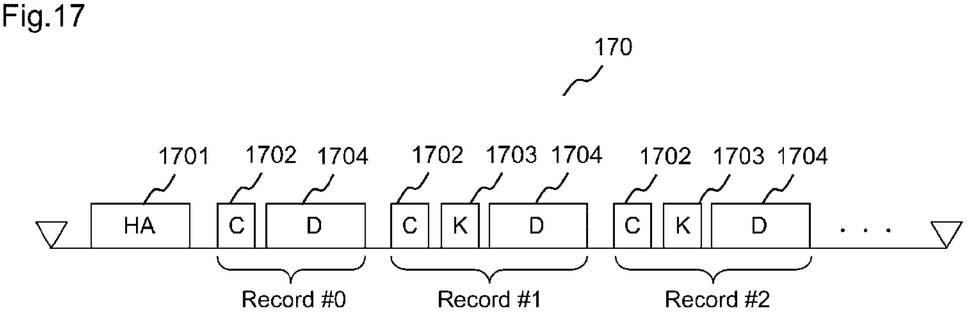
FIG. 17 is a view illustrating a data format in a main frame track.

FIG. 17 is a view illustrating the data format in a main frame track. Before describing the recovery processing of the TBL invalid status of FIG. 20, the data format of the user data used in the recovery processing of the TBL invalid status will be described using the data format of the main frame track of FIG. 17 as an example. The data format 170 of the main frame track is composed of an HA section 1701 storing the track address within the LDEV (host VOL 20), a C section (Count section) 1702 storing a track address in the LDEV, a record number, a key length and a data length, and a K section (Key section) 1703 and a D section (Data section) 1704 as user data sections. Further, a single data group includes a single HA section 1701, one or more record sections composed of a C section 1702 and a D section 1704 or a K section 1703 (record number 0, 1, 2 and so on).

In the state where no user data is stored, generally only the HA section 1701 and the format-like (which is rarely handled as user data and the record length is fixed) record number 0 exist in the track. If a read command is issued to a track whose area is not allocated to the TSE VOL 60, the internal program (microprogram) of the storage subsystem 1 will not allocate areas newly but operates as if only the HA section 1701 and the record number 0 exist. If there are no HA section and the record section in the track during the process flow of the present embodiment, it is described that there is no user data in that track.

<Recovery Processing of TBL Invalid Status>

The recovery processing of the TBL invalid status of FIG. 20 is a process for resolving the invalid status using the track address of the HA section 1701 within the host VOL 20. In the recovery processing of the TBL invalid status, at first, the MPPK 11 sets the reference target TBL to the first backward TBL within the LDEV (step S2001). Thereafter, the MPPK 11 determines whether the reference target TBL is in "allocated" status or not (step S2002).

If the reference target TBL is not in "allocated" status (step S2002: NO), the MPPK 11 determines whether a subsequent backward TBL 602 exists or not in step S2008. If a subsequent backward TBL 602 exists (step S2008: YES), the MPPK 11 sets the subsequent backward TBL 602 as the reference target TBL (step S2009), and performs the processes of step S2002 and subsequent steps again.

If the reference target TBL is in "allocated" status (step S2002: YES), the MPPK 11 searches the backward TBL in allocated status having the same track address as the reference target TBL (backward TBL) (step S2003). In other words, all the backward TBLs in allocated status having the same track address as the address stored in the address area of the reference target TBL stored in the track address area 6022 of the backward TBL 602 are extracted.

Thereafter, the MPPK 11 confirms the address of the user data stored in the user track area 63 corresponding to the overlapped backward TBL group (one or more) extracted in step S 2003. Since the forward TBL 602 is in abnormal status, the address stored in the track address area 6012 is not reliable. Therefore, the MPPK 11 must search the corresponding forward TBL based on the address information (track address within the host VOL) of the HA (Home Address) section 1701 in the user data (FIG. 17) of the main frame format stored in the user track area 63.

The MPPK 11 extracts the forward TBL (forward TBL having consistency) with a track address within the host VOL that is the same as the address information of the HA section 1701 of the user data corresponding to the backward TBL. The MPPK 11 executes the extracting operation of the forward TBL having consistency to all of the backward TBL groups and searches all the forward TBLs having consistency with the backward TBLs (step S2004).

Next, if there is one set of TBLs having consistency extracted in step S2004 (step S2005: YES), the MPPK 11 sets all the backward TBLs 602 other than the backward TBL 602 having consistency to "unallocated" (step S2006). Further, in order to realize a one-to-one correspondence between the backward TBL 602 and the forward TBL 601 having consistency, the MPPK 11 stores the track address in the TSE VOL 60 corresponding to the backward TBL 602 to the track address area 6012 of the forward TBL 601 (step S2007).

If the number of sets of backward TBL 602 having consistency extracted in step S2004 is not one (step S2005: NO), the MPPK 11 determines whether the number of sets of backward TBL 602 having consistency is zero (none) (step S2010). If the number of sets of backward TBL 602 having consistency is not zero (step S2010: NO), the MPPK 11 blockades the whole TSE VOL 60 (step S2012). In other words, if there are two or more sets of TBLs having consistency, failure has occurred not only in the page storing the TSE DMT but also in the user track area, and abnormality has occurred in the whole TSE VOL 60. Therefore, the MPPK 11 determines that the TBL cannot be recovered, and blockades the whole TSE VOL 60.

If there are zero sets of backward TBL 602 having consistency (step S2010: YES), the MPPK 11 sets all the backward TBL 602 having no consistency to "unallocated" (step S2011) and executes the processes of step S2008 and subsequent steps. The above-described recovery processing enables to resolve the TSE invalid status as shown in FIG. 16.

As described according to the recovery processing of FIG. 15 and the recovery processing of the invalid status of FIG. 20, it becomes possible to recover the forward TBL 601 in abnormal status and to restore the correspondence with the backward TBL 602 in normal status using the track address of the backward TBL 602 in normal status and the address information of the HA section 1701 of the user data corresponding to the backward TBL 602.

<TSE DMT Recovery (F3) Forward TBL: Abnormal, Backward TBL: Abnormal>

If failure occurs to both pages storing the forward TBL and the backward TBL (TSE DMT storing pages) and access to the TBL information becomes completely impossible, the track address within the host VOL 20 is stored in the user data in data format in the main frame track. Therefore, the correspondence between the forward TBL and the backward TBL can be recovered by referring to the track address in the host VOL 20, as in the recovery processing of the TSE invalid status. FIG. 18 is a flowchart illustrating the recovery processing when failure has occurred to both the forward TBL and the backward TBL. The operation of recovery processing when failure occurs to both TBLs will be described with reference to FIG. 18.

At first, the MPPK 11 deletes all pages (TSE DMT storing pages 61 and 62) corresponding to the forward TBL 601 and the backward TBL 602 in abnormal statuses (step S1801). Next, the MPPK 11 executes allocation of normal pages to the page delete areas and update of the page DMT 400, and sets the statuses of all the TBLs within the allocated pages to "unallocated" (step S1802). Then, the MPPK 11 sets the reference target track as the first track of the user track area 63 (step S1803).

Next, the MPPK 11 determines whether a page has been allocated to the user track area 63 of the reference target track based on the allocated/unallocated/failure information 404 of the corresponding page DMT 400 (step S1804). When a page is allocated to the user track area 63 (step S1804: YES), the MPPK 11 determines whether there is no user data in the reference target track based on the contents of the HA section 1701 and the record number 0 (step S1805). This step utilizes that in the state where no user data is stored, only the HA section 1701 and a format-like (which is rarely handled as user data and the record length is fixed) record number 0 exist in the track. If a page is unallocated to the user track area 63 (step S1804: NO) or if no user data exists in the reference target track (step S1805: YES), the MPPK 11 executes the processes of step S1810 and subsequent steps.

If it is determined that user data exists in the user track area 63 (step S1805: NO), the MPPK 11 stores the track address in the host VOL 20 stored in the HA section 1701 of the user data to the track address area 6022 of the backward TBL 602 corresponding to the reference target track (step S1806). Then, the MPPK 11 changes the TBL status area 6021 of the backward TBL 602 from "unallocated" to "allocated" (step S1807).

Next, the MPPK 11 stores the track address of the reference target track (track address in the TSE VOL 60) to the track address area 6012 of the forward TBL 601 corresponding to the track address (address in the host VOL 20) of the HA section 1701 (step S1808), and changes the TBL status area 6011 of the forward TBL 601 from "unallocated" to "allocated" (step S1809).

Next, the MPPK 11 determines whether a subsequent track exists in the user track area 63 (step S1810), and if a subsequent track exists, the subsequent track is set as the reference target track (step S1811). Then, the MPPK 11 repeats the processes of step S1804 and subsequent steps until the process is executed to all the tracks in the user track area 63.

As described, it becomes possible to recover the TBL in abnormal status using the address in the user data stored in the user track area 63 corresponding to the forward TBL 601 and backward TBL 602 in abnormal status via the recovery processing of FIG. 18, and to restore the correspondence between the forward TBL 601 and the backward TBL 602.

Figure 19:
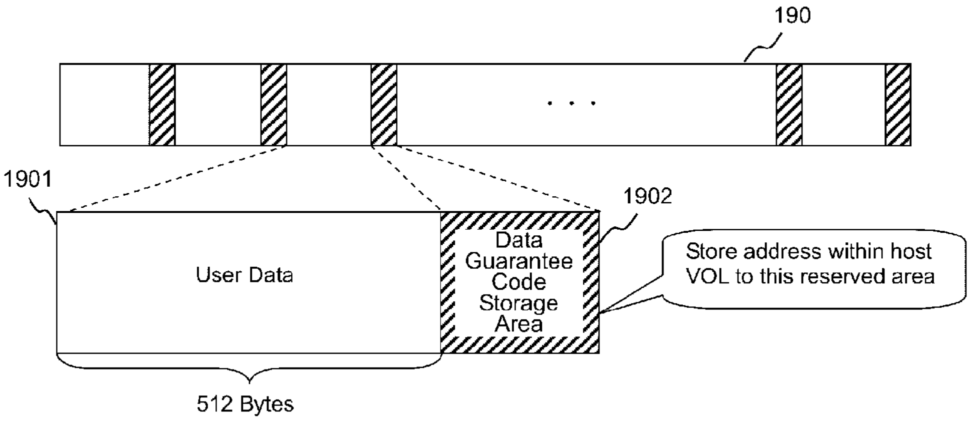
FIG. 19 is a view illustrating a data storage format for storing a volume address information.

According to the TBL recovery processing described above, the format in the main frame track is taken as an example. However, even if the format in the main frame track is not used, the recovery of the TBL (TSE DMT) and the restoration of the corresponding relationship is enabled similar to using the format data in the main frame track by storing the track address within the host VOL to a data guarantee code storage area 1902 of the user data 1901 in a data storage format 190 illustrated in FIG. 19. Further, it is possible to add an error correction code such as a hamming code or a Reed-Solomon code to the data in data format 170 of the main frame track format or the data storage format 190 so as to recover the TBL via the error correction code at first, and if the recovery is not possible, the recovery processing of FIG. 14, 15 or 18 can be executed, by which the recovery time can be reduced.

INDUSTRIAL APPLICABILITY

The aforementioned embodiments have illustrated the art of recovering the TSE DMT when the TSE DMT is stored in the TSE VOL. The art of recovering the DMT according to the present embodiment can also be applied to a case where a PAGE DMT is stored in the DP VOL. In that case, a PAGE DMT for the forward table is arranged in an area corresponding to a single page worth of DP VOL while a PAGE DMT for the backward table is arranged in an area corresponding to another single page worth of DP VOL.

Further, it is also possible to perform allocation of a size composed of a group of a plurality of tracks, instead of each track. In this case, a DMT is created for each unit composed of a group of tracks, a forward table and a backward table are stored in the volume, and if failure occurs, the table is recovered via a method similar to that described in the aforementioned embodiments.

REFERENCE SIGNS LIST

1 Storage subsystem
2 Host computer
3 Network
4 Management terminal
5 Storage system
10 CHAPK (CHanel Adapter PacKage)
11 MPPK (Micro Processor PacKage)
12 DKAPK (DisK Adapter PacKage)
13 Cache memory (CM)
14 Shared memory (SM)
15 Internal network
16 Storage unit
20 Host volume
21 DP (Dynamic Provisioning) volume
22 Pool

23, 24 Pool volume
60 TSE volume
61 TSE DMT for forward TBL
62 TSE DMT for backward TBL
63 User track area
101 CHAIF (CHannel Adapter InterFace)
110 CPU (Central Processing Unit)
111 Local Memory (LM)
121 DKAIF (DisK Adapter InterFace)
161 Storage device
170 Data format of main frame track
190 Data storage format
231, 232, 233, 241, 242, 243 Page
400 Page DMT (Dynamic Mapping Table)
401 Page number
402 LDEV number within pool volume
403 Address within pool volume
404 Allocated/unallocated/failure information
405 LDEV number within DP volume
406 Address within DP volume
407 Subsequent page number (for queue)
410 Pool queue
420, 430 DP volume queue
601, 601*a*, 601*b* Forward TBL
602, 602*a*, 602*b* Backward TBL
901 Track address in host volume
902 Track address in TSE volume
1701 HA section (Home Address section)
1702 C section (Count section)
1703 K section (Key section)
1704 D section (Data section)
1901 User data area
1902 Data guarantee code storage area
6011, 6021 TBL status area
6012 Track address area within TSE volume
6022 Track address area within host volume

The invention claimed is:

1. A storage subsystem coupled to a host computer comprising:
- a storage device unit for storing data from the host computer;
- a control unit for controlling a storage area of the storage device; and a memory unit accessed by the control unit;
- wherein a logical device in the storage device unit is allocated to a virtual logical device provided to the host computer and a user data from the host computer is stored in the logical device of the storage device unit using a page mapping information stored in the memory unit and a track mapping information stored in the storage device unit;
- the track mapping information is composed of a first track information including a status information and an address information within the logical device and a second track information including a status information and an address information within the virtual logical device;
- the first track information and the second track information are associated via the address information; and
- when the first track information or the second track information is abnormal, recovery is performed using an address information in the other track information which is normal.

2. The storage subsystem according to claim 1, wherein the status information is any one of the following statuses representing a corresponding relationship between the first track information and the second track information, which are an unallocated status, an allocation in progress status, and an allocated status.

3. The storage subsystem according to claim 2, wherein the user data is in either a first data format composed of an address information section within a virtual logical device, a control information section and a data section, or a second data format composed of a data section and a data guarantee code storage section including a preliminary area section.

4. The storage subsystem according to claim 3, wherein the abnormal detection of track information specifies a page and a first track information or a second track information in which failure exists using a failure page bitmap within a logical device, a failure flag of the first track information and a failure flag of the second track information.

5. The storage subsystem according to claim 4, wherein if abnormality is detected only in the second track information, an area storing the second track information is deleted, a new area storing the second track information is allocated to the deleted area, the status information of the second track information is set to unallocated status, the corresponding second track information based on the address information of the first track information is extracted to recover the corresponding relationship thereof, and then the status information of the second track information is updated to allocated status.

6. The storage subsystem according to claim 4, wherein if abnormality is detected only in the first track information, an area storing the first track information is deleted, a new area storing the first track information is allocated to the deleted area, the status information of the first track information is set to unallocated status, the corresponding first track information based on the address information of the second track information is extracted to recover the corresponding relationship thereof, and then the status information of the first track information is updated to allocated status.

7. The storage subsystem according to claim 6, wherein if only the second track information shows a corresponding relationship to the first track information, all the second track information having a same address information as the address information of the second track information are extracted, a first track information is specified using an address information in the data corresponding to the extracted second track information, the specified first track information and the second information are associated, and a status information of a second track information that could not be associated is set to unallocated status.

8. The storage subsystem according to claim 7, wherein if the number of track information that could be associated is two or more, the logical device storing the track mapping information and the user data is blockaded.

9. The storage subsystem according to claim 4, wherein if abnormality is detected in both the first track information and the second track information, the storage area of the first track information and the storage area of the second track information are deleted, a new area is allocated to the deleted area, the status information of the track information is set to unallocated status, and based on the control information and the address information in the data stored in the data storage area, the first track information is associated with the second track information.

10. The storage subsystem according to claim 1, wherein the storage device is composed of a device of one or more types selected from an SSD type device, an SAS type device, or a SAT A type device.

11. The storage subsystem according to claim 10, wherein the storage device includes at least the SSD type device or the SAS type device, and the track mapping information is stored in the SSD type device or the SAS type device.

* * * * *